Patented Oct. 25, 1932

1,884,431

UNITED STATES PATENT OFFICE

CORNELIUS B. WATSON AND RUDOLPH C. OSTERSTROM, OF CHICAGO, ILLINOIS, ASSIGNORS TO THE PURE OIL COMPANY, OF CHICAGO, ILLINOIS, A CORPORATION OF OHIO

SOLUTION ACCELERATOR FOR OIL DYES

No Drawing.   Application filed February 6, 1931.   Serial No. 514,059.

This invention relates to an improved solution accelerator for oil soluble dyes, and an object thereof resides in the provision of an accelerator whereby the process of coloring or tinting hydrocarbon oils, particularly gasolines or motor fuels, may be expedited and permanency or stability of the imparted color obtained.

In marketing petroleum products it is often desirable, for the purpose of identification or otherwise distinguishing certain grades of oil, to color them by the use of dyes. So-called oil soluble dyes are now available in commercial gravities and are used extensively in the petroleum industry for the above mentioned purpose. Considerable time, however, is required in bringing the dyes into solution and large quantities of oil are usually necessary to effect a complete solution of the dye. If the dye is added to the oil in a storage tank or in a tank car an appreciable quantity settles to the bottom unless the oil is vigorously agitated by air or some mechanical means. This is undesirable on account of the time and expense involved and the loss of a portion of the more volatile constituents if the oil under treatment contains low boiling point fractions, as for example gasoline.

The practice usually followed in such customary operations is to prepare a concentrated solution of the coloring material in a relatively small quantity of oil and when complete solution is effected, this solution is pumped into the pipe line through which the bulk of oil to be dyed is passing, leading to the storage tank or car, in the proper proportion to impart to the total quantity of oil the desired color or tint. Unless the dye is readily soluble in the oil, the difficulties experienced in such a procedure are quite obvious.

Benzene has been used extensively in preparing such concentrated solutions of the dyes because of the ready solubility of the dyes in benzene. This adds considerably to the expense of the operation, however, and offers the inconvenience of necessitating additional containers for the benzene and of keeping a ready supply of this material on hand. Benzene is not always available in many localities and the expense involved due to the volume required often makes its use prohibitive.

We have discovered that when dyes of the azo or anthraquinone series, or those commonly used for coloring petroleum products are mixed in relatively small proportions with chemical compounds of the benzene series, preferably those of the dihydroxy type, the solution of the dye is greatly facilitated and much time, labor and expense, is saved in accomplishing the desired results. The presence of such chemical compounds also adds to the color stability of the dye when it is in oil solution so that it does not fade readily on long standing or exposure to light.

In using a dihydroxy benzene, for example, catechol, as a solution accelerator, we find that reasonably satisfactory results are obtained when mixed in the proportion of one part of dry dye to three or four parts of the dry benzene derivative, though the readiness with which the dye goes into solution in oil is increased as the quantity of the dihydroxy benzene increases. We may therefore use a mixture consisting of one part of dry dye to ten or twelve parts of dihydroxy benzene or in proportions with even wider limits than those stated above, depending upon the solubility of the particular dye. We find in actual practice that one part of dye to seven parts of dihydroxy benzene is the optimum proportion with most of the dyes. For convenient use the dry dye and crystalline dihydroxy benzene are ground together and added to the petroleum product, such as gasoline, in the manner described above. The comparatively small quantities of the products required affords a very convenient and inexpensive method of dyeing and accelerating the dyeing of petroleum products and insures a color which is stable upon exposure to light or long standing.

We have also discovered that when one of the hydroxyl groups is in the para position, with respect to the other hydroxyl group, its effect in rendering the dye more readily soluble is not so great as when the hydroxyl is in the ortho or meta positions. Similarily, we have noted that when the hydroxyl is in the ortho position, with respect to the other hydroxyl group, such a dihydroxy benzene compound is more effective in bringing the dye into solution than when the hydroxyl is in either the meta or para positions. We therefore prefer to use a compound of the dihydroxy benzene type with the hydroxyl in the ortho position.

This invention is particularly applicable to the tinting of cracked, highly unsaturated, hydrocarbon motor fuel distillates. Such distillates when colored or tinted lose color more rapidly than motor fuels of the saturated type, due undoubtedly to the presence of the highly reactive hydrocarbons found therein. The presence of the hydroxy benzene compound tends to stabilize these hydrocarbons and to prevent chemical changes therein which tend to produce loss of color.

It will be apparent that the method of imparting color to hydrocarbon oils as above set forth is simple and easy to practice, and, because of the small amounts of materials required, is quite economical. In addition, petroleum oils colored or tinted by this method are invariably more stable than when colored by previous methods and compounds, due to the presence of the solution accelerating agent. The oils so treated are novel in that they have the characteristic of not losing color upon being stored or exposed to light and air. As many changes could be made in the process and products described, and many apparently widely different embodiments of this invention effected without departing from the scope thereof, it is to be understood that all matter contained in the description shall be interpreted as illustrative and not in a limiting sense.

What is claimed is:

1. The method of imparting artificial coloration to gasoline-like petroleum oils, which comprises producing a mechanical mixture composed of a finely divided oil soluble dye and a hydroxy-benzene compound, and adding this dry mechanical mixture to the petroleum oils to be colored for solution therein.

2. The method of imparting artificial coloration to gasoline-like petroleum oils, which comprises producing a mechanical mixture of a dry finely divided oil soluble dye and a crystalline hydroxy-benzene compound, and then adding said dry mechanical mixture to the petroleum oils to be colored for dissolution therein.

3. The method of imparting artificial coloration to cracked low boiling unsaturated hydrocarbon oils, which comprises producing a finely divided mechanical mixture of an oil soluble dye compound of the azo anthraquinone series and the dry crystalline hydroxy-benzene compound, and then adding said mixture to the oils to be colored for dissolution therein.

4. The method of imparting artificial coloration to petroleum oils, which comprises producing a dry mechanical mixture composed of a ground oil soluble dye compound and catechol, and adding said mixture to the petroleum oils to be colored.

5. The method of imparting artificial coloration to gasoline-like petroleum oils, which comprises producing a dry mechanical mixture composed of a ground oil soluble dye compound of the azo or anthraquinone series and catechol, and adding said mixture to the oils to be colored.

6. The method of dying gasoline-like hydrocarbons, which consists in adding to such hydrocarbons a dry mechanical mixture composed of a finely divided dye and a crystalline hydroxy-benzene compound wherein the mixture consists of one part of dye to several parts of the benzene compound.

7. A solution accelerator for oil soluble dyes consisting of a dry mechanical mixture formed from a finely divided oil soluble dye and a hydroxy-benzene compound.

8. A compound for dying gasoline, comprising a dry mechanical mixture composed of finely divided catechol and an oil soluble dye.

In testimony whereof we affix our signatures.

CORNELIUS B. WATSON.
RUDOLPH C. OSTERSTROM.